United States Patent [19]
Allen

[11] Patent Number: 6,152,080
[45] Date of Patent: Nov. 28, 2000

[54] PANEL LEVELING SYSTEM FOR USE WITH ANIMAL KENNELS

[75] Inventor: Ken Allen, Spring Valley, Ohio

[73] Assignee: The Mason Company, Leesburg, Ohio

[21] Appl. No.: 09/339,009

[22] Filed: Jun. 23, 1999

[51] Int. Cl.$^7$ .................................................. A01K 1/00
[52] U.S. Cl. ...................... 119/452; 119/455; 119/480; 52/126.1
[58] Field of Search .................................... 119/482, 452, 119/455, 458, 488, 514, 527; 52/126.1, 126.3, 126.4, 126.5

[56] References Cited

U.S. PATENT DOCUMENTS

| | | |
|---|---|---|
| 2,877,875 | 3/1959 | Bolt . |
| 2,969,565 | 1/1961 | Levy . |
| 3,885,361 | 5/1975 | De Schutter . |
| 4,454,690 | 6/1984 | Dixon . |
| 4,794,879 | 1/1989 | Thom et al. . |
| 5,116,256 | 5/1992 | Allen . |
| 5,212,918 | 5/1993 | Newhouse et al. . |
| 5,713,304 | 2/1998 | Vosjoli et al. ........................... 119/266 |
| 5,870,970 | 2/1999 | Katz ........................................... 119/72 |

*Primary Examiner*—Peter M. Poon
*Assistant Examiner*—Yvonne R Abbott
*Attorney, Agent, or Firm*—Wood, Herron & Evans, LLP

[57] ABSTRACT

A panel leveling system for use in connection with animal kennel runs sharing a common sloping floor. The panel leveling system comprises a base extending parallel the slope of the floor, a vertically oriented wall panel and a sealing element extending between the base and the wall panel. The sealing element prevents fluid from passing between the base and wall panel and further functions to maintain upper and lower edges of the wall panel in a horizontal orientation.

20 Claims, 4 Drawing Sheets

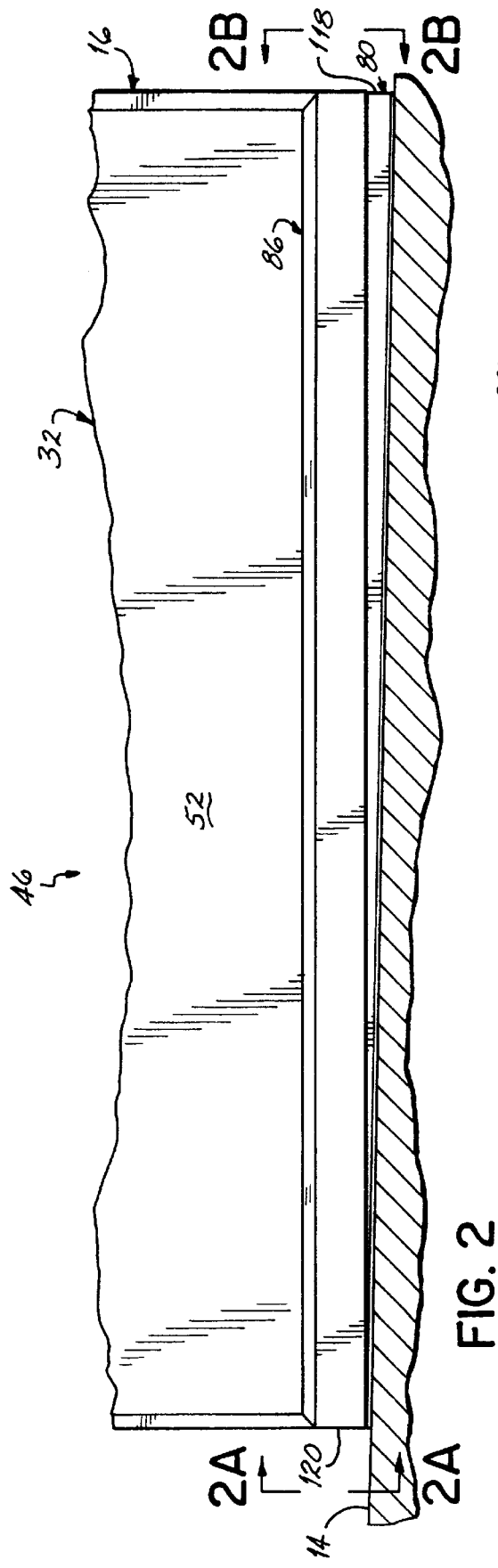
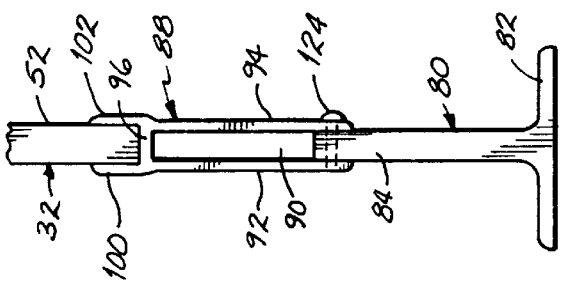
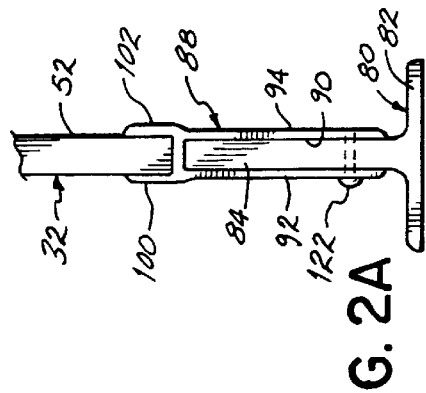

PANEL LEVELING SYSTEM FOR USE WITH ANIMAL KENNELS

FIELD OF THE INVENTION

This invention relates to animal kennels and more particularly to common sidewall panels separating adjacent animal kennel runs located above a common sloping floor.

DESCRIPTION OF THE PRIOR ART

Animal cages or kennel runs are typically constructed in a side-by-side parallel relation so that a maximum number of kennel runs fit within a specified area. In such a row of kennel runs, each kennel run sidewall except the endmost sidewalls functions as a sidewall of a pair of adjacent kennel runs and will be referred to in this application as a common sidewall.

Rows of kennels are used indoors and outdoors and may be arranged in a plurality of different configurations. One common configuration located inside buildings used to temporarily board animals such as dogs is a plurality of parallel side-by-side kennel runs arranged in two parallel rows with a walking aisle between the rows. In such an arrangement it is common for a row of kennel runs to be located above a common sloping floor to facilitate the removal or drainage of animal wastes away from the kennel runs.

With so many animals in such close proximity to one another, diseases or other illness may be easily transferred from one animal to another. This commonly occurs through the transfer of fluids from one animal to another such as for example, the waste from one animal's run passing underneath the run sidewall into the other animal's kennel run.

Conventional chain-link fencing does not prevent the transfer of liquids between adjacent kennel runs. Conventional chain-link fencing enables animals in adjacent kennel runs to contact one another and also permits fluids from one kennel run to pass under or through the chain-link fencing into adjacent kennel runs. In order to prevent fluids from passing underneath or through common sidewalls of adjacent kennel runs, preferably at least a lower portion of the common sidewall is constructed of a solid imperforate material. Solid panels or partitions used in the lower portions of kennel sidewalls are disclosed in applicant's own U.S. Pat. No. 5,116,256. This patent discloses an isolation device for isolating kennel runs from wash water and waste contamination and for facilitating clean out of the kennel runs.

In adjacent kennel runs it is also desirable to have a water-tight seal between the common sidewall and the floor so that fluid does not pass underneath the sidewall. This is particularly applicable when the floors of adjacent kennel runs are being hosed down in order to wash animal waste off the floors of the kennel runs into a drain. In order to facilitate the cleaning of the kennel runs, the common floor of a row of kennel runs is sloped in order for the waste to move downwardly to a drain or other structure. Such floors are commonly sloped so that the rear of the kennel run floor is below the front of the kennel run floor enabling the waste to be washed rearwardly. Alternatively the floors may be sloped toward one side edge of the kennel floor so as to wash waste into a trough or other drainage system such as disclosed in U.S. Pat. No. 4,794,879.

In a kennel system in which the floor slopes and the kennel sidewalls comprise solid panels, at least in part, the lower edge of the sidewall panels must be cut or formed at the same angle or degree of slope of the floor in order to maintain the upper edges of the sidewalls, panels in a horizontal orientation and at the same height. Keeping the upper edges of the sidewall panels horizontal and preferably at an identical height is desirable both esthetically and structurally. Oftentimes, such solid panels extend only halfway up the height of the kennel runs, the remaining top half of the kennel sidewalls being made of a material which enables air to flow between adjacent kennel runs such as for example, conventional chain-link fencing. Cutting such an isolation panel at the proper angle in order to maintain the upper edge of the panel in a horizontal orientation requires a great deal of precision and is therefore expensive.

For both the health and safety of the animals housed therein, kennel runs constructed to prevent animals from contacting one another and prevent fluids such as animal waste from passing underneath common sidewalls of adjacent kennels are needed.

Therefore, it has been one objective of the present invention to provide a panel leveling system utilizing generally rectangular isolation panels in order to sealingly separate adjacent animal kennels sharing a common sloping floor.

It has been a further objective of the present invention to provide a panel leveling system for use in connection with animal kennels which is adapted to be used with any number of different sloping floors.

It has been a further objective of the present invention to provide a panel leveling system which prevents waste or other fluids from passing underneath the isolation panels separating adjacent animal kennels.

SUMMARY OF THE PRESENT INVENTION

The present invention which accomplishes these objectives comprises a panel leveling system for use in connection with animal kennel runs sharing a common sloping floor. The wall panel leveling system comprises a vertically oriented wall panel having an upper edge, a lower edge, a base sealingly engaged with the common sloping floor and a sealing element extending between the vertically oriented wall panel and the base. The base is oriented such that a first end of the base is lower than a second end of the base. In this regard, the base extends generally parallel the slope of the floor but may deviate slightly from such orientation. The sealing element is secured to the vertically oriented wall panel and is also secured to a portion of the base. The engagement between the base and the sealing element may take numerous forms in order to maintain the lower edge of the vertically oriented wall panel in a horizontal orientation but in all instances creates a seal which functions to prevent fluid from passing between adjacent animal kennel runs underneath the wall panel.

Each embodiment of base utilized in accordance with the present invention has a generally horizontal portion which is sealingly engaged with the sloping floor and a generally vertical portion extending upwardly from the generally horizontal portion of the base. The generally vertical portion of the base is sealingly engaged with the sealing element while the generally horizontal portion of the base rests on the sloping floor.

The sealing element of the present invention may take on numerous forms. In the preferred embodiment of the present invention, the sealing element comprises a dual channel extrusion. The dual channel extrusion is preferably aluminum but may be made of any material The dual channel extrusion has a downwardly open first channel and an upwardly open second channel. The downwardly open first channel is defined by a pair of spaced first channel walls.

Similarly, the upwardly open second channel is defined by a pair of spaced second channel walls. The downwardly open first channel is sized so as to receive the generally vertical portion of the base. Similarly, the upwardly open second channel is sized so as to receive a lower portion including the lower edge of the vertically oriented wall panel. The two first channel walls may be considered flanges. Other forms of the sealing element have only one downwardly extending flange which is secured to the generally vertical portion of the base any number of ways including the use of fasteners. Although this application illustrates and discusses several different preferred forms or configurations of sealing element, the configuration of the sealing element is not intended to be limited in any respect. Other configurations of sealing element not specifically illustrated or described may be utilized in accordance with the present invention.

In the preferred embodiment of the present invention different amounts of the generally vertical portion of the base are secured inside the downwardly open first channel of the sealing element in order to maintain the upper and lower edges of the wall panel in a horizontal orientation and provide a liquid impervious seal below the wall panel. More of the generally vertical portion of the base is located inside the downwardly open first channel of the sealing element at the first end of the base than at the second of the base in order to maintain the upper and lower edges of the base in a horizontal orientation. Fasteners are used to fix and maintain the proper amounts of the base inside the downwardly open first channel of the sealing element. If the sealing element does not have a downwardly open first channel, but rather has one downwardly extending flange engaged with a portion of the generally vertical portion of the base, fasteners may also be used to secure the downwardly extending flange of the sealing element to the generally vertical portion of the base in order to maintain the horizontal orientation of the edges of the wall panel.

In each of the preferred embodiments of the present invention, the wall panel leveling system is impervious to liquid along the entire length of the kennel run. Such a liquid tight seal prevents liquid from passing through or underneath the wall panel leveling system of the present invention and therefore prevents unnecessary health risks to the animals inside the kennel runs. In order to accomplish such a liquid impervious seal, the base must be sealingly engaged with the sloping floor so that liquid does not pass underneath the base. Similarly, the vertically oriented wall panel must be sealingly secured to the sealing element and the sealing element sealingly secured to the generally vertical portion of the base. With the wall panel leveling system of the present invention including an imperforate isolation wall panel, multiple kennel runs may be constructed which prevent liquids including but not limited to animal waste from passing from one kennel run to another. Such kennel runs may be quickly and easily cleaned, the animal waste passing along the sloping floor to drains or other structures in order to be removed.

Thus, the panel leveling system of the present invention accomplishes two important goals: 1) it functions to maintain a generally vertically oriented rectangular wall panel in a proper orientation in which the edges of the wall panel are horizontal and at the same height and 2) it creates a liquid impervious seal between adjacent kennel runs in order to improve the sanitary conditions inside the kennel runs. These and other objectives and advantages of the present invention will be more apparent from the following description of the drawings.

BRIEF DESCRIPTION OF THE DRAWINGS

FIG. 2 is a cross-sectional view taken along the line 2—2 of FIG. 1.

FIG. 2A is an end elevational view taken along the line 2A—2A of FIG. 2.

FIG. 2B is an end elevational view taken along the line 2B—2B of FIG. 2.

DETAILED DESCRIPTION OF THE PREFERRED EMBODIMENTS OF THE PRESENT INVENTION

Figure 1:
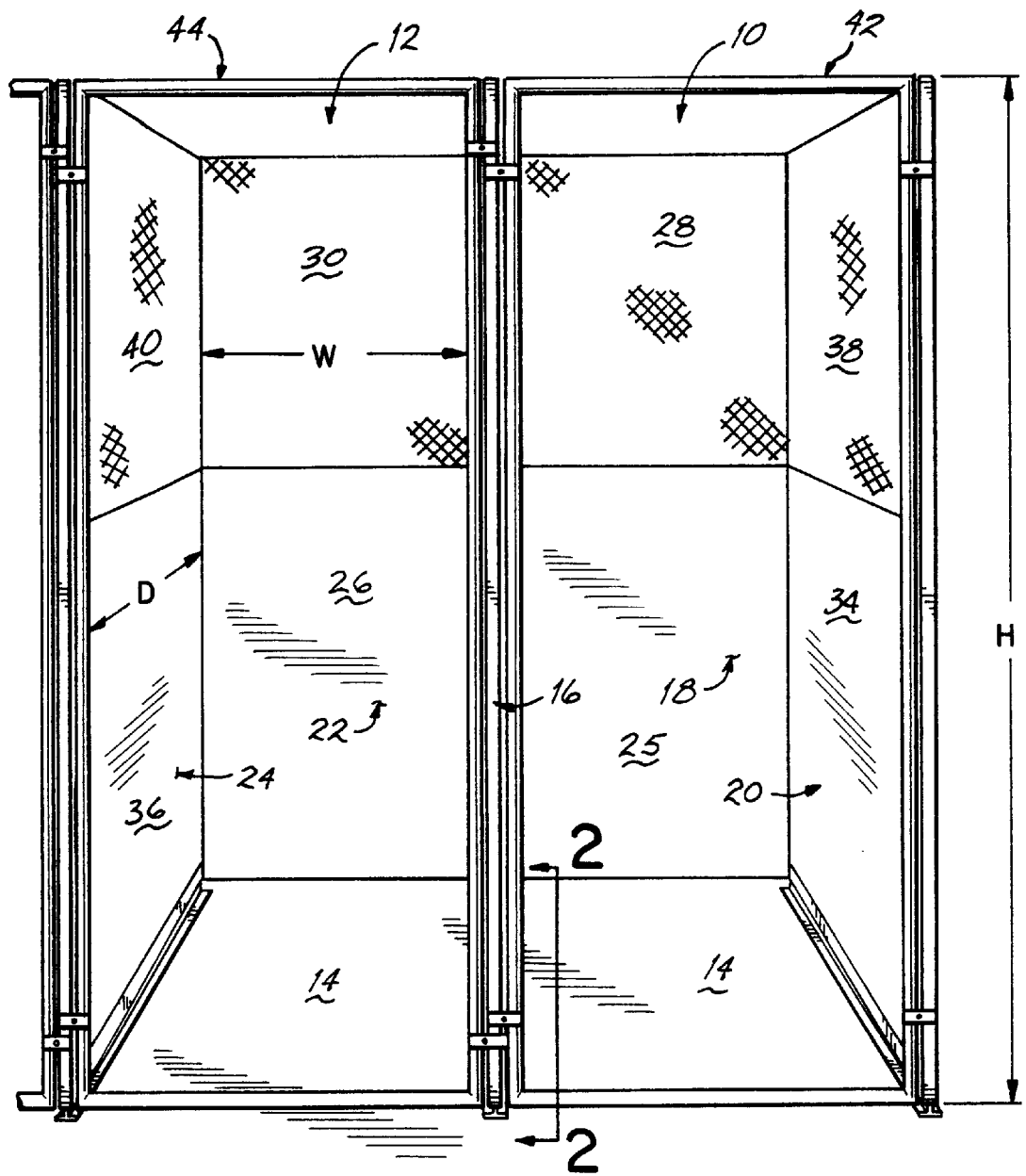
FIG. 1 is a front perspective view of a pair of adjacent kennel runs utilizing the wall panel leveling system of the present invention.

Referring to the drawings, and particularly to FIG. 1, there is illustrated a pair of animal kennel runs 10 and 12 which are supported above a common sloping floor 14. The kennel runs 10,12 also share a common sidewall 16 (partially illustrated in FIG. 2). Each of the kennel runs 10,12 preferably has an identical height H, width W and depth D, as indicated in FIG. 1. The kennel runs may or may not have tops.

Kennel run 10 has a back wall 18, a sidewall 20 in addition to common sidewall 16 and a door, which is not shown. Similarly, kennel run 12 has a back wall 22 and a sidewall 24 in addition to common sidewall 16 along with a door (not shown).

As best illustrated in FIG. 1, each back wall 18,22 comprises an impervious solid vertically oriented wall panel 25,26, respectively, and an upper panel 28,30, respectively. The impervious lower wall panels prevent fluids from passing between adjacent kennel runs. The upper panels ensure adequate airflow between the kennel runs and enable persons standing in one kennel run to view adjacent kennel runs.

Each sidewall 16,20 and 24 also comprises an impervious lower wall panel and an upper panel. As illustrated in FIG. 2, the common sidewall 16 comprises a lower impervious wall panel 32 and an upper panel (not shown). Similarly, sidewalls 20 and 24 comprise lower impervious wall panels 34,36, respectively, and upper panels 38,40, respectively. The two different panels or portions of each side and back wall are typically made separately and secured together in any number of ways. However, each wall may be a unitary member as well. The upper panels may be made of numerous materials which allow air to flow therethrough including but not being limited to plastic mesh or chain-link fencing.

As illustrated in FIG. 1, kennel run 10 has a generally rectangular frame 42 located at the front of the kennel run 10 to which a door (not shown) may be hingedly secured. Similarly, kennel run 12 has a rectangular frame 44 to which a door (not shown) may be hingedly connected. Although not illustrated, the sidewalls and back walls of the kennel runs may have rectangular frames.

Figure 3:
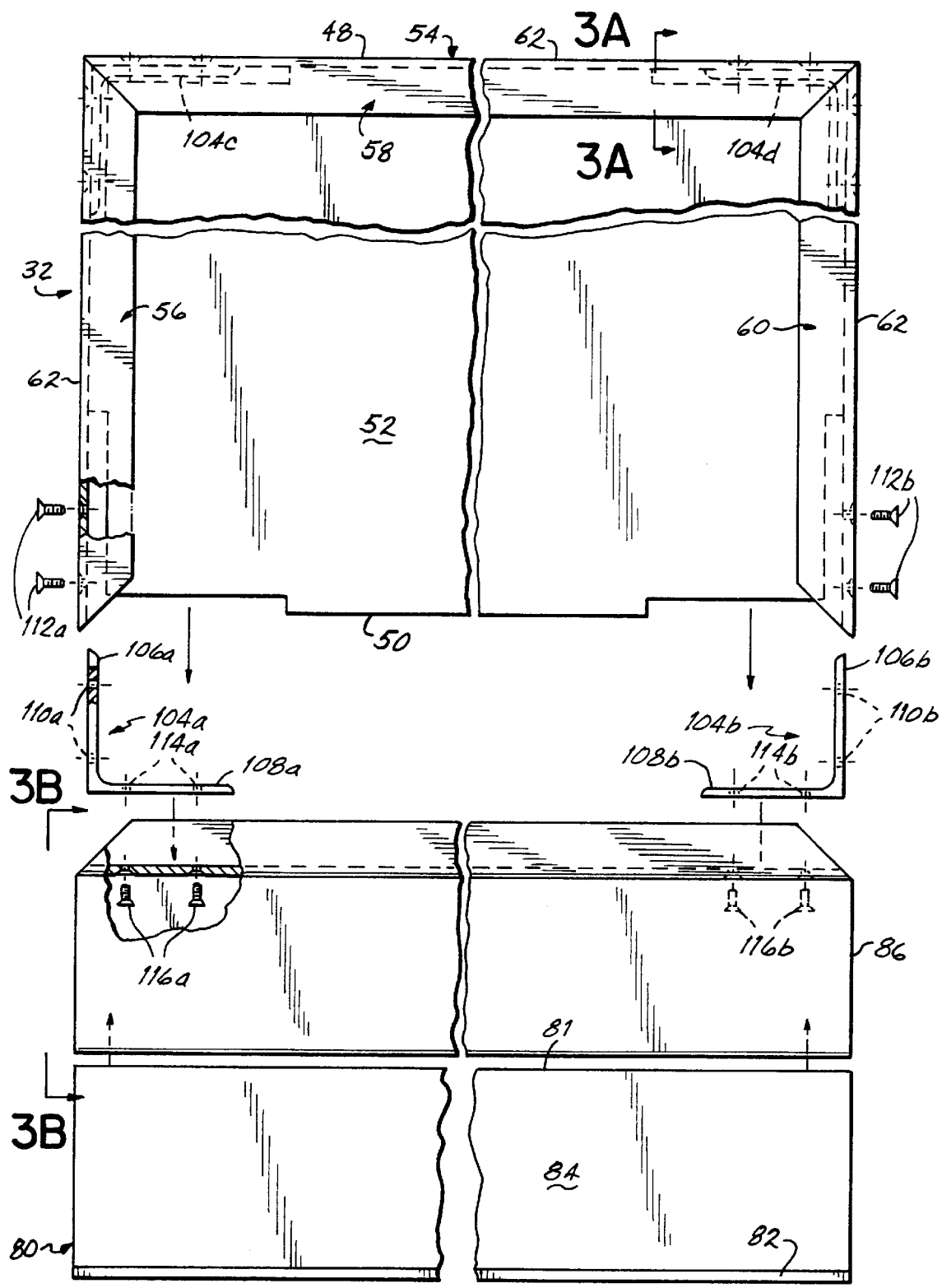
FIG. 3 is a partially disassembled view of the wall panel leveling system of one preferred embodiment of the wall panel leveling system of the present invention.

Turning now to FIGS. 2 and 3, the wall panel leveling system 46 used between adjacent kennel runs 10 and 12 (illustrated in FIG. 1), is illustrated. The wall panel leveling system 46 is illustrated and described as being used with a common sloping floor separating adjacent kennels or kennel runs. However, the wall panel leveling system of the present invention is versatile enough so that it may be used on generally non-sloping floors as well. Therefore, the wall panel leveling system 46 of the present invention can accommodate multiple environments and may easily be transferred from one facility to another.

Referring to FIG. 3, the wall panel leveling system 46 comprises vertically oriented wall panel 32 having an upper edge 48 and a lower edge 50. The wall panel 32 is illustrated in FIG. 3 as comprising a solid (imperforate) panel member 52 which may be made of galvanized steel, ABS plastic or any other material. The wall panel 32 also comprises a three-sided metal frame 54 which is placed around the periphery of the panel member 52 for stability and reinforcement of the wall panel. The frame 54 is illustrated as comprising three frame members 56,58 and 60 but may alternatively comprise one piece or any other number of pieces.

Figure 3A:
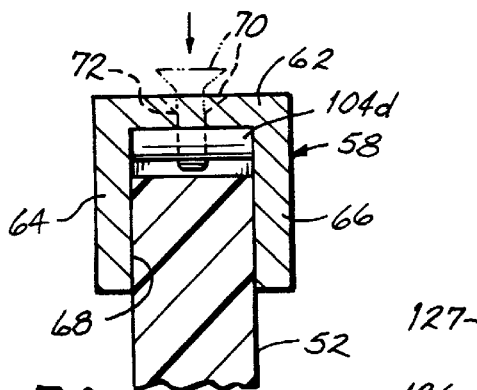
FIG. 3A is a view taken along the line 3A—3A of FIG. 3.

FIG. 3A illustrates the relationship of the frame 54 and the panel member 52 of the wall panel 32. Each frame member 56,58,60 has a top portion 62 and two parallel side portions 64 and 66 depending from the top portion 62. The three portions of each frame member define an interior channel 68 into which is inserted a portion of the panel member 52. The panel member 52 is secured inside the channel 68 of each frame member. A pair of L-shaped brackets 104c,104d and any number of fasteners 70 are used to secure the frame members 56,58,60 cf frame 54 to each other. Fastener 70 passes through an aperture 72 formed through the top portion 62 of the frame member and down into an aperture 114d formed in the L-shaped bracket 104d. Alternatively, the L-shaped brackets 104c,d may be omitted and the fasteners 70 pass directly into the outer edge of the panel member 52.

Although FIG. 3 illustrates a wall panel comprising an interior panel member 52 and a frame 54, other configurations of wall panel 32 may be used in accordance with the present invention as well. For example, a wall panel 32 not having a frame member at all is within the purview of the present invention. Such a generally rectangular wall panel would still have an upper edge and a lower edge which are maintained in a horizontal orientation when used in accordance with the present invention.

Referring to FIG. 3, in addition to the vertically oriented wall panel 32 described hereinabove, the wall panel leveling system 46 of the present invention comprises a base 80 having a generally horizontal portion 82 and a generally vertical portion 84 extending upwardly from the generally horizontal portion 82. As best illustrated in FIGS. 2A and 2B, the base 80 has a generally T-shaped cross-sectional configuration.

Another component of the wall panel leveling system 46 is a sealing element 86. The sealing element 86 may assume many different configurations but in each case extends between the vertically oriented wall panel 32 and the base 80. The sealing element 86 creates a seal between the base 80 and the wall panel 32 so that fluids are not able to pass through the wall panel leveling system 46 of the present invention thereby ensuring that fluids do not pass between adjacent kennel runs. Each embodiment of sealing element of the present invention has at least one downwardly extending flange which is secured to the generally vertical oriented portion of the base 80.

Figure 3B:
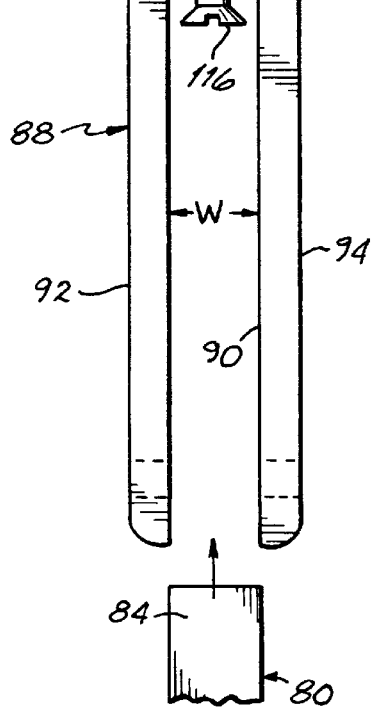
FIG. 3B is a view taken along the line 3B—3B of FIG. 3.

One preferred configuration of sealing element 86 is illustrated in FIGS. 2, 2A and 2B. This configuration of sealing element will be referred to as a dual channel extrusion 88 and is best illustrated in FIGS. 2A, 2B and 3B. The dual channel extrusion 88 has a downwardly open first channel 90 defined by a pair of spaced first channel walls 92,94. These first channel walls 92,94 are spaced apart from each other a distance W approximately equal to the thickness of the generally vertical portion 84 of the base 80. Each of these first channel walls 92,94 extend downwardly from a central web 96 of the dual channel extrusion 88. The dual channel extrusion 88 also has an upwardly open second channel 98 defined by a pair of spaced second channel walls 100,102. The distance between the second channel walls 100,102 is approximately equal to the thickness of the panel member 52 of the wall panel 32 so that the wall panel 32 may partially reside inside the second channel 98 of the dual channel extrusion 88 once the wall panel leveling system is assembled.

Referring now to FIG. 3, the last component of the wall panel leveling system 46 of the present invention is a pair of L-shaped brackets 104a,104b. Each of these brackets functions to secure the wall panel 32 to the sealing element 86. Each bracket 104a, 104b has a vertical web 106a,106b and a horizontal web 108a,108b, respectively. Each vertical web 106a,106b has a pair of holes 110a, 110b, respectively, through which fasteners 112a, 112b, respectively, pass in order to secure the vertical webs of the brackets 104a,104b to the wall panel 32. Similarly, horizontal webs 108a,108b have holes 114a,114b through which fasteners 116a,116b pass in order to secure the sealing element 86 to the frame 54 of the wall panel 32. Other structures or fasteners other than L-shaped brackets may be used to secure the wall panel 32 to the sealing element 86 in accordance with the present invention.

Referring to FIG. 2. adjacent kennel runs are commonly placed on a sloping floor 14 in order to better remove waste. The base 80 of the present invention is placed on the sloping floor generally parallel the direction of slope of the floor with the generally horizontal portion of the base contacting the floor along the entire length of the base. The wall panel leveling system 46 of the present invention extends longitudinally of the kennel run along a common sidewall of adjacent kennel runs. The common floor is illustrated and described as sloping from front to back. However, the wall panel leveling system of the present invention may also be used with a common floor which slopes from back to front. FIG. 2 illustrates a floor which slopes from front to back so that a first end 118 of the base is below a second end 120 of the base. FIG. 2A illustrates the second end 120 of the base 80, and FIG. 2B illustrates the first end 118 of the base 80. Because the base 80 has a generally uniform height along its entire length (see FIG. 3), the top edge 81 of the base 80 slopes downwardly from front to back parallel the slope of the floor. As illustrated in FIGS. 2A and 2B, different vertical dimensional portions of the generally vertical portion 84 of the base 80 are secured inside the downwardly open first channel 90 of the dual channel extrusion 88 in order to maintain the upper and lower edges 48,50 of the wall panel 32 in a horizontal orientation, and also to create a seal so that fluids may not pass through the wall panel leveling system 46 either immediately above or below the base 80. As illustrated in FIG. 2A at the second end 120 of the base 80, the entire height of the generally vertical portion 84 the base 80 is located inside the downwardly open first channel 90 of the dual channel extrusion 88 and secured in such a position with fasteners 122. As illustrated in FIG. 2B at the first end 118 of the base 80, the generally vertical portion 84 of the base 80 does not fully extend inside the interior of the downwardly open first channel 90 of the dual channel extrusion 88. Rather, the generally vertical portion 84 of the base 80 only partially extends into the interior of the downwardly open first channel 90 of the dual channel extrusion 88 and is maintained in such a position with fasteners 124. By securing different amounts of the generally vertical portion 84 of the base 80 inside the downwardly open first channel 90 of the dual channel extrusion 88, the upper and lower edges 48,50 of the wall panel 32 are maintained in a horizontal orientation and an impervious seal is created between the wall panel 32 and the sloping floor 14. The amount of the generally vertical portion 84 of the base 80 which is secured inside the downwardly open first channel 90 of the dual channel extrusion 88 depends upon the degree of slope of the floor. The less the slope, the more of the first end 118 of the base 80 is fixedly secured inside the downwardly open first channel 90 of the dual channel extrusion sealing element 88 in order to maintain the upper and lower edges 48,50 of the wall panel 32 in a horizontal orientation.

As mentioned hereinabove, the sealing element 86 of the present invention may take on numerous forms in addition to the dual channel extrusion 88. Additionally, the base 80 of the present invention may take on numerous forms in order to cooperate with the sealing element 86. Regardless of the configuration of the sealing element and base, the sealing element has at least one downwardly extending flange which is secured to a portion of the base 80 in order to create an impervious seal between the wall panel 32 and the sloping floor 14.

Figure 4A:
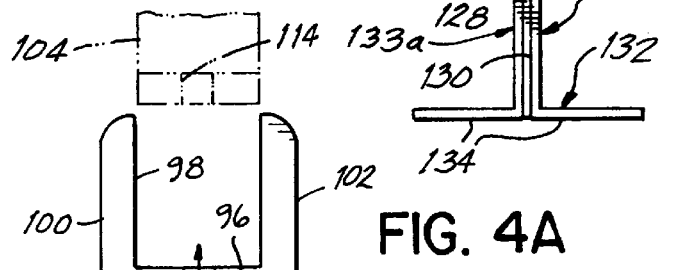
FIG. 4A is an end elevational view similar to FIG. 2A illustrating a first alternative preferred embodiment of the wall panel leveling system of the present invention.
Figure 4B:
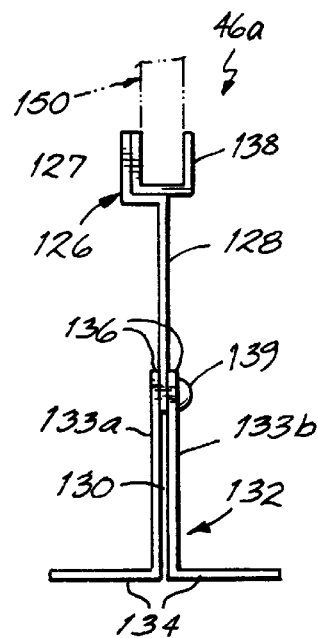
FIG. 4B is an end elevational view similar to FIG. 2B illustrating the first alternative preferred embodiment of the wall panel leveling system of the present invention.

FIGS. 4A and 4B illustrate an alternative embodiment of wall panel leveling system 46a. This alternative embodiment comprises an alternative configuration of sealing element and base. The sealing element 126 has a downwardly extending flange 128 adapted to be received in a slot 130 in a base 132. The base 132 comprises two L-shaped members 133a and 133b, each having a horizontal portion 134 and a vertical portion 136. An L-shaped upper portion 127 of the sealing element 126 is fixedly secured to a frame member 138 of a wall panel 150. By adjusting the amount of flange 128 located inside the slot 130 of the base 132 and securing the flange 128 in place with fasteners 139, the upper and lower edges of the wall panel 150 may be maintained in a horizontal orientation and an impervious seal is created between the floor and the wall panel. Like FIGS. 2A and 2B, FIGS. 4A and 4B are representations of the second and first ends, respectively, of the base 132.

Figure 5A:
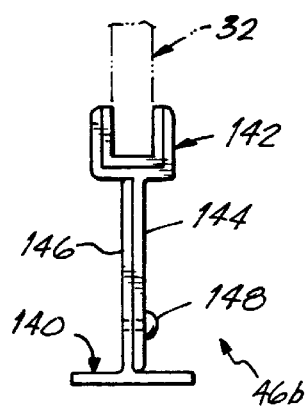
FIG. 5A is an end elevational view similar to FIG. 2A illustrating a second preferred alternative embodiment of the present invention.
Figure 5B:
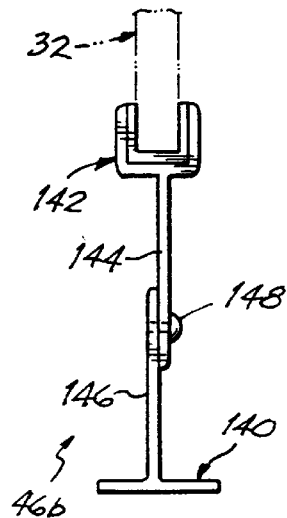
FIG. 5B is an end elevational view similar to FIG. 2B illustrating the second preferred alternative embodiment of the present invention.

FIGS. 5A and 5B illustrate another alternative embodiment of wall panel leveling system 46b. This alternative embodiment also comprises an alternative configuration of sealing element and base. The base 140 used in this embodiment has a generally T-shaped cross-section and is configured similarly to the base of the preferred embodiment illustrated in FIGS. 2A, 2B and 3. The sealing element 142 has one downwardly extending flange 144 which is secured to a generally vertical portion 146 of the base with fasteners 148. FIG. 5A illustrates a second end of the base 140, whereas FIG. 5B illustrates a first end of the base 140 which is located below the second end of the base similar to the orientation of FIGS. 2A and 2B.

While I have described several preferred embodiments of the present invention, persons skilled in the art will appreciate changes and modifications which may be made without departing from the spirit of the invention. For example, other configurations of sealing elements and bases may be utilized in accordance with the present invention without departing from the spirit thereof. Therefore, I do not intend to be limited except by the scope of the following claims:

I claim:

1. A wall panel leveling system for use in connection with animal kennel runs sharing a common sloping floor, said wall panel leveling system comprising:
   a vertically oriented wall panel having a lower edge,
   a base sealingly engaged with said sloping floor and being oriented such that a first end of said base is lower than a second end of said base,
   a sealing element secured to said lower edge of said vertically oriented wall panel, said sealing element extending between said vertically oriented wall panel and said base wherein said lower edge of said wall panel is maintained in a horizontal orientation and fluid is unable to pass between said adjacent kennel runs.

2. The wall panel leveling system of claim 1 wherein said sealing element has a downwardly extending flange which is secured to a portion of said base.

3. The wall panel leveling system of claim 1 wherein said base has a generally horizontal portion and a generally vertical portion extending upwardly from said generally horizontal portion.

4. The wall panel leveling system of claim 3 wherein said sealing element has a downwardly extending flange which is secured to said generally vertical portion of said base with fasteners.

5. The wall panel leveling system of claim 1 wherein said sealing element is a dual channel extrusion.

6. A wall panel leveling system for use in connection with animal kennel runs sharing a common sloping floor, said wall panel leveling system comprising:
   a generally rectangular vertically oriented wall panel having upper and lower edges,
   a base having a generally horizontal portion and a generally vertical portion extending upwardly from said generally horizontal portion, said generally horizontal portion of said base resting upon said sloping floor and being oriented so that a first end of said base is lower than a second end of said base,
   a dual channel extrusion having a downwardly open first channel and an upwardly open second channel, said downwardly open first channel being defined by a pair of spaced first channel walls and said upwardly open second channel being defined by a pair of spaced second channel walls, said downwardly open first channel being sized so as to receive said generally vertical portion of said base and said upwardly open second channel being sized so as to receive said lower edge of said vertically oriented wall panel wherein different amounts of said generally vertical portion of said base may be secured inside said downwardly open first channel in order to maintain said upper and lower edges of said wall panel in a horizontal orientation.

7. The wall panel leveling system of claim 6 wherein said dual channel extrusion is aluminum.

8. The wall panel leveling system of claim 6 wherein fasteners secure said different amounts of said generally vertical portion of said base inside said downwardly open first channel of said dual channel extrusion.

9. The wall panel leveling system of claim 6 wherein said base has a T-shaped cross-sectional configuration.

10. A wall panel leveling system for use in connection with animal kennel runs sharing a common sloping floor, said wall panel leveling system comprising:

a vertically oriented, generally rectangular wall panel having straight upper and lower edges, a base having a generally horizontal portion and a generally vertical portion extending upwardly from said generally horizontal portion, said generally horizontal portion of said base resting upon said sloping floor, a sealing element joining said wall panel and said base, said sealing element having a downwardly open first channel, said first downwardly open channel being defined by a pair of spaced first channel walls, said downwardly open first channel being sized so as to receive said vertical portion of said base wherein different amounts of said generally vertical portion of said base may be secured inside said downwardly open first channel in order to maintain said edges of said wall panel in a horizontal orientation.

11. The wall panel leveling system of claim 10 wherein said sealing element is aluminum.

12. The wall panel leveling system of claim 10 wherein fasteners secure said generally vertical portion of said base inside said downwardly open first channel of said sealing element.

13. The wall panel leveling system of claim 10 wherein said base has a T-shaped cross-sectional configuration.

14. A method of maintaining upper and lower edges of a vertically oriented rectangular wall panel in a horizontal orientation when the wall panel is supported on a sloping floor, said method comprising:

providing a base having a generally horizontal portion and a generally vertical portion extending upwardly from said generally horizontal portion, orienting said base on the sloping floor so that a first end of the base is below a second end of the base, providing a dual channel extrusion having a downwardly open first channel and an upwardly open second channel, said downwardly open first channel being defined by a pair of spaced first channel walls and said upwardly open second channel being defined by a pair of spaced second channel walls, securing said lower edge of said wall panel inside said second channel, securing said generally vertical portion of said base inside said downwardly open first channel in order to maintain said upper and lower edges of said wall panel in a horizontal orientation.

15. The method of claim 14 wherein securing said generally vertical portion of said base inside said downwardly open first channel comprises passing fasteners through said first channel walls and through said generally vertical portion of said base.

16. A method of separating a pair of adjacent animal kennel runs sharing a sloping floor, said method comprising:

providing a vertically oriented, generally rectangular wall panel having a lower edge, orienting a base having a generally horizontal portion and a generally vertical portion extending upwardly from said generally horizontal portion on the sloping floor so that a first end of the base is below a second end of the base, providing a sealing element having a downwardly open first channel defined by a pair of spaced first channel walls, securing said sealing element to said wall panel, securing said generally vertical portion of said base inside said downwardly open first channel of said sealing element so as to create an impervious seal and maintain said lower edge of said wall panel in a horizontal orientation.

17. The method of claim 16 wherein securing said generally vertical portion of said base inside said downwardly open first channel comprises passing fasteners through said first channel walls and through said generally vertical portion of said base.

18. The method of claim 16 wherein securing said sealing element to said wall panel comprises securing said lower edge of said wall panel inside an upwardly open second channel of said sealing element.

19. A method of preventing liquids from passing between adjacent animal kennel runs sharing a common sloping floor, said method comprising:

orienting a base having a generally horizontal portion and a generally vertical portion extending upwardly from said generally horizontal portion on said common sloping floor so that a first end of the base is below a second end of the base, said base being sealingly engaged with said sloping floor so that liquid may not pass underneath said base, providing a wall panel having a sealing element secured to a lower edge of the wall panel, securing said sealing element to said generally vertical portion of said base so as to create a liquid impervious seal.

20. The method of claim 19 wherein said sealing element has a downwardly open first channel defined between a pair of spaced first channel walls and different amounts of said generally vertical portion of said base may be secured inside said first channel of said sealing element in order to maintain said lower edge of said wall panel in a horizontal orientation.

* * * * *